United States Patent [19]

Cifuentes et al.

[11] Patent Number: 5,017,222
[45] Date of Patent: May 21, 1991

[54] POLISH CONTAINING MICRONIZED WAX PARTICLES

[75] Inventors: Martin E. Cifuentes; Suzanne M. Greenleaf, both of Midland County, Mich.

[73] Assignee: Dow Corning Corporation, Midland, Mich.

[21] Appl. No.: 447,280

[22] Filed: Dec. 7, 1989

[51] Int. Cl.$^5$ .................. C09G 1/08; C08L 91/06
[52] U.S. Cl. ........................... 106/10; 106/3; 106/271; 106/272
[58] Field of Search ............... 106/3, 10, 271, 272

[56] References Cited

U.S. PATENT DOCUMENTS

| | | | |
|---|---|---|---|
| 2,728,679 | 12/1955 | Wright | 106/10 |
| 2,849,324 | 8/1958 | Cox | 106/10 |
| 3,152,917 | 10/1964 | McCoy et al. | 106/271 |
| 3,393,078 | 7/1968 | Lockhart et al. | 106/10 |
| 3,442,676 | 5/1969 | Belfort | 106/271 |
| 3,508,933 | 4/1970 | Yates | 106/10 |
| 3,576,779 | 4/1971 | Holdstock et al. | 260/29.2 |
| 3,709,708 | 1/1973 | Strazdins | 106/271 |
| 3,836,371 | 9/1974 | Kokoszka | 106/10 |
| 3,847,622 | 11/1974 | Brandl et al. | 106/271 |
| 3,890,271 | 6/1975 | Kokoszka | 260/46.5 |
| 3,960,575 | 6/1976 | Martin | 106/10 |
| 3,971,733 | 7/1976 | Hawkins | 106/271 |
| 4,013,475 | 3/1977 | Liebowitz et al. | 106/271 |
| 4,218,250 | 8/1980 | Kasprzak | 106/3 |
| 4,269,739 | 5/1981 | Grejsner | 106/10 |
| 4,342,602 | 8/1982 | Petz et al. | 106/191 |
| 4,846,887 | 7/1989 | Kuehnle | 106/270 |
| 4,908,063 | 3/1990 | Baker et al. | 106/31 |

Primary Examiner—Mark L. Bell
Assistant Examiner—Helene Klemanski
Attorney, Agent, or Firm—Jim L. DeCesare

[57] ABSTRACT

A polish formulation containing as components thereof at least one member selected from the group consisting of waxes, solvents, surfactants, thickening agents, abrasives, dyes, odorants, and other ingredients normally used in making polishes. The improvement resides in incorporating into the polish formulation at least one wax in the form of micronized particles.

14 Claims, No Drawings

POLISH CONTAINING MICRONIZED WAX PARTICLES

BACKGROUND OF THE INVENTION

This invention relates to a polish formulation, and more particularly to a polish formulation containing micronized wax particles, which provide the polish formulation with improved rub out characteristics and ease of application.

Polishes are used to produce a glossy finish on a surface as well as to prolong the useful life of the surface. The gloss provided by the polish is the result of components in the polish which leave a coating and that function to smooth and clean the surface. Floor polish, furniture polish, and shoe polish, rely upon a deposited film. Car and boat polish formulations result in a glossy and protective film and may contain abrasives for removing weathered paint and soil as well as old built-up polish. Metal polish contains ingredients for abrasive smoothing of the surface being treated and for surface cleaning, as well as components that function to remove and retard the build-up of tarnish.

Motor vehicle polish is formulated in order to remove road film and oxidized paint, and to provide a continuous glossy film which resists water and its removal by water and car wash detergents. Such vehicle polishes contain several major functional ingredients including an abrasive. The abrasive, however, must be mild enough to avoid scratching of the painted surface, and representative of such mild acting materials are, for example, fine grades of aluminum silicate, diatomaceous earth, and various silicas. Straight and branched chain aliphatic hydrocarbons are employed to facilitate the detergency of the polish against oil based traffic soils and debris, and provide the solvency characteristics necessary in the production of a stable formulation. These hydrocarbons also control the drying rate of the formulation. Wax constitutes another polish ingredient and is one of the two film forming materials in the polish. The wax is spread and leveled and produces a high luster following buffing of the surface. Blends of soft and hard wax are often employed in order to facilitate ease of buffing and the durability of the polish against environmental antagonists. Exemplary waxes are paraffin wax, microcrystalline petroleum wax, carnauba wax, candelilla vegetable wax, montan coal derived wax, and synthetic polymeric waxes such as oxidized polyethylene.

Silicone materials are included in polishes as the other film forming ingredient. Such silicone materials also function as lubricants for easing the application of the polish as well as its buffing, and act as release agents for dried abrasive. The silicone materials spread easily and provide a uniform high gloss and with it water repellency. Such materials typically are dimethylsilicones, however, aminofunctional silicone products are becoming more prevalent. The aminofunctional products result in films having increased resistance to removal from the surface by detergents and the environment believed to be the result of their ability to plate out on a painted surface and to crosslink and bond to that surface.

A car polish may also contain an emulsifier, a thickener, and a stabilizer, for the production of a homogeneous stable product of desired consistency. Such polishes may be solid in form, semisolid, presoftened, or liquid. The polish, for example, can be solvent based or an emulsion, and in either case is a liquid, semi-solid, or solid in constitution. Typically, liquid emulsions include five to twenty weight percent of an abrasive, ten to thirty-five weight percent of solvent, two to fifteen weight percent of a silicone material, and up to about five weight percent wax. In an emulsion paste formulation, the wax ingredient is increased in level from three to twenty-five weight percent.

Polish formulations containing organosilicon compounds are not new. For example, aminofunctional siloxanes have been employed in polish formulations in U.S. Pat. No. 3,508,933, issued Apr. 28, 1970. Such siloxanes can also be found in U.S. Pat. No. 3,576,779, issued Apr. 27, 1971, where water in oil and oil in water emulsion polishes are formulated. These aminofunctional silicones are also disclosed as ingredients in various polish formulations in U.S. Pat. No. 3,836,371, issued Sept. 17, 1974, and U.S. Pat. No. 4,218,250, issued Aug. 19, 1980. Similarly, micronized waxes are not new and such wax particles can be found, for example, in U.S. Pat. No. 4,846,887, issued July 11, 1989. However, the prior art does not teach the use of micronized wax particles in polish formulations. For purposes of the present invention, the disclosure of the '887 patent is considered incorporated herein by reference.

SUMMARY OF THE INVENTION

This invention is directed to a polish formulation containing as components thereof at least one member selected from the group consisting of waxes, solvents, surfactants, thickening agents, abrasives, dyes, odorants, and other ingredients normally used in making polishes. The improvement resides in incorporating into the polish formulation at least one wax in the form of micronized particles.

The polish formulation is preferably water based and is in the form of a water in oil polish, although the polish formulation may also be formulated in the form of an oil in water polish. The micronized wax particles preferably have an average diameter of the order of magnitude of from about two to about five microns, although sizes up to about thirty microns may be employed. Most preferably, the micronized wax particles have an average diameter of the order of magnitude of three microns. The polish formulation includes at least one organosilicon detergent resistant film forming compound which may be an aminofunctional polysiloxane.

These and other features, objects, and advantages, of the herein described present invention will become more apparent from a consideration of the following detailed description thereof.

DETAILED DESCRIPTION

The waxes which can be employed in the polish formulations of this invention are well known to those skilled in the art and will vary depending on the specific use intended for the polish and the properties being sought. Specific examples of suitable waxes include animal waxes such as beeswax, spermaceti, lanolin and shellac wax; vegetable waxes such as carnauba, candelilla, bayberry, and sugarcane; mineral waxes such as ozacertie, ceresin, montan, paraffin, microcrystalline and petrolatum; and synthetic waxes such as ethylenic polymers, polyol ether-esters and chlorinated naphthalenes.

The abrasives which can be used in the polish formulations of this invention are well known to those skilled in the art and the particular abrasive will depend on the nature of the surface to be polished and the results desired. Specific examples of suitable abrasives include aluminum silicate, diatomaceous earth, pumice, Fuller's earth, bentonite, silicas, tripoli, hydrated calcium silicate, chalk, colloidal clay, magnesium oxide, red iron oxide, and tin oxide.

Also there is commonly employed in polish formulations solvents such as V.M.&P. naphtha, Stoddard solvent, naphtha mineral spirits, water, kerosene; surfactants such as polyoxyethylene sorbitan monooleate, and fatty alcohol amine sulfate; thickening agents such as soya lecithin and methyl cellulose; detergent resistant additives such as aminofunctional and carboxyfunctional silicones; colorants, odorants, corrosion inhibitors and other ingredients normally used in making polishes. Such ingredients are well known to the skilled artisan and hence are only mentioned to the above extent for the sake of brevity.

It should be noted that this invention is applicable to all forms of wax and/or abrasive containing polishes which includes solvent based polishes, water based emulsion polishes and paste wax polishes.

The detergent resistant additives are organic polysiloxanes which are film formers having a viscosity in the range of about 5 to as high as several million centistokes, preferably about 100 to about 10,000 centistokes. More preferably, a mixture of polysiloxanes having relatively higher and relatively lower viscosities is employed. Such polysiloxanes have the repeating unit

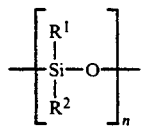

wherein n is an integer having a value greater than 1, $R^1$ is an alkyl radical containing 1 to 7 carbon atoms, inclusive, or a phenyl group, $R^2$ is hydrogen, an alkyl radical containing 1 to 7 carbon atoms, inclusive, or a phenyl group. Illustrative polysiloxanes encompassed by the above formula are polydimethylsiloxane, polydiethylsiloxane, polymethylethyl siloxane, polymethylphenylsiloxane, polydiphenylsiloxanes, diphenylsilanediol, and copolymers of two or more of the foregoing siloxanes. Polysiloxane-oxyalkylene block copolymers may also be utilized. In addition to the aforementioned organic polysiloxanes, the present compositions may also include an aminofunctional polysiloxane as well as a silane. The amino-functional polysiloxane is a silicone fluid with highly polar pendant aminoalkyl modifying groups that enhance the durability of the film formed by the polysiloxanes present and promotes adhesion of the formed film to a wide variety of substrates.

Particularly preferred aminofunctional polysiloxanes include reactive and non-reactive hydrolyzable and non-hydrolyzable derivatives which are wholly, or in part, terminally substituted with aminopropyl, aminobutyl, or diamino pendant chains. As stated above, the present composition also contemplates an optional, but preferred, liquid silane constituent, which promotes the mutual solubility of the other organic silicone compounds present in the mixture utilized by the present compositions. Suitable liquid silanes are represented by the formula $R_3$-Si$(OR^4)_3$ wherein $R^3$ can be an alkyl radical containing one to three carbon atoms, inclusive or phenyl, and $R_4$ can be an alkyl radical containing one or two carbon atoms, inclusive. A preferred liquid silane constitutent is an alkyl trialkoxysilane such as methyltrimethoxysilane, ethyltriethoxysilane, phenyltrimethoxysilane, phenyltriethoxysilane, and the like.

The aminofunctional siloxane compositions of the present invention may be represented by the following formula:

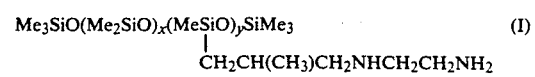

Such compositions are described in more or less detail in U.S. Pat. No. 3,508,933, issued Apr. 28, 1970, in U.S. Pat. No. 3,836,371, issued Sept. 17, 1974, and in U.S. Pat. No. 3,890,271, issued June 17, 1975. The preparation of these compositions and their use in polishes is also detailed in the aforementioned patents, the disclosures of which are incorporated herein by reference thereto. Particular of such compositions prepared and falling within the scope of the present invention is set forth in Table I.

TABLE I

| Compound (I) | x | y |
| --- | --- | --- |
| A | 45.75 | 2.25 |
| B | 69.25 | 3.75 |
| C | 96 | 2 |
| D | 188 | 10 |
| E | 295.9 | 2.1 |
| F | 400 | 8 |

The aminofunctional siloxanes of the formula (I) type may also be prepared by an alternate method from that set forth in U.S. Pat. No. 3,508,993, U.S. Pat. No. 3,836,371, and U.S. Pat. No. 3,890,271, aforementioned. In the alternate method, the starting material is methyldimethoxy ethylenediaminoisobutyl silane of the formula:

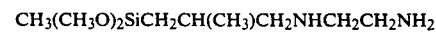

This aminofunctional silane is distilled to an active concentration of between about 95-99%. The silane is hydrolyzed with three moles of water added to one mole of the silane. The material is batch distilled at atmospheric pressure and at a temperature of about one hundred and thirty degrees centigrade. Methanol and residual water are then removed by vacuum stripping to yield an aminofunctional hydrolyzate. The aminofunctional hydrolyzate is added to a mixture of polydimethylsiloxane of viscosity of 1.5 centistokes, a dimethylcyclic of the formula $(Me_2SiO)_n$ where n is three, four, or five, and a catalyst such as potassium hydroxide or potassium silanolate. This mixture is equilibriated to a polymer by agitation and heat at about one hundred-fifty degrees centigrade. The mixture is cooled to about 80-90 degrees centigrade or lower and the catalyst is neutralized by the addition of acetic acid accompanied with mixing. The non-volatile content is increased by stripping of the volatiles under vacuum, followed by filtration of the material in a pre-coated plate and frame filter for the purpose of removing any haze in order to obtain a clarified product. A typical example of this procedure is set forth below.

EXAMPLE I

Into a round bottom flask was added 3,482.8 grams of a dimethylcyclic, 439.2 grams of hydrolyzate, 78.4 grams of polydimethylsiloxane of viscosity of 1.5 cs, and 38.3 grams of potassium silanolate catalyst. The contents of the flask were mixed under a nitrogen atmosphere for twenty minutes. Heat was applied to the flask and the contents were maintained at one hundred-fifty degrees centigrade for four hours. The mixture was cooled to thirty-three degrees centigrade. The catalyst was neutralized by the addition to the flask of 2.14 grams of acetic acid. The fluid was stirred overnight and filtered. The resulting product was water clear and had a viscosity of 354 cs. The product contained five mol percent amine and was identified as the material set forth in Table I where $x=188$ and $y=10$.

The micronized wax particles employed in the polish formulations of the present invention may be made from any conventional wax but are preferably micronized particles of Fischer-Tropsch waxes, polyethylene wax, polyethylene-polytetrafluoroethylene wax, polytetrafluoroethylene wax, polypropylene wax, natural waxes, mineral waxes, montan wax derivatives, fatty acid derivatives, amide waxes, and wax mixtures. The particle size of the micronized wax particles may vary from an average diameter of about two microns to a magnitude of the order of about thirty to forty-five microns, although particles sizes of from two to five microns are preferred, with three microns being most preferable. Such micronized wax particles are manufactured by Micro Powders, Inc., Scarsdale, N.Y. Other micronized wax particles suitable for incorporation into the polish formulations of the present invention are disclosed in U.S. Pat. No. 4,846,887, issued July 11, 1989, which is considered incorporated herein by reference.

The polish formulations in accordance with the present invention are preferably in the form of an emulsion, and include an oil phase containing a solvent, an organosilicon detergent resistant film forming compound, a surfactant, and the micronized wax. The water phase includes water, an abrasive, a freeze thaw additive such as propylene glycol and sodium borate, colorants, and an emulsified wax of conventional type. Water in oil emulsions are preferred, however, oil in water emulsions are also contemplated herein. It has been found that the polish formulations of the present invention containing wax in the form of micronized particles, possess the advantage in that the polish is easier to apply, the rub out is much improved, and the appearance of the polished surface can be enhanced in comparison to conventional and prior art polish formulations which do not contain micronized wax.

The following examples further illustrate the concepts of the present invention.

EXAMPLE II

The following procedure was employed in the formulation of water-in-oil based polishes described in this invention. The appropriate amount of solvent was weighed into a mixing tank. While agitating the solvent, the ingredients including the silicones, emulsifier, and micronized wax were added. The contents were mixed until uniformly dispersed. In a separate tank, the abrasive, emulsified wax dispersion, and other additives (e.g., colorant) were mixed with the water until the blend was uniform. The water phase was slowly added to the stirred oil phase. The formed emulsion was blended for 5-15 minutes. Representative polish formulations, made by the process described above, are illustrated in Table II.

EXAMPLE III

This example illustrates the advantage of using a micronized wax in the polish formulation over that of a conventional wax. Formulation A and B were applied to warm sections of a 1988 dark blue Buick LaSabre. The air temperature and relative humidity at the time of application were 63° F. and 80 percent, respectively. After allowing a suitable length of time for the polish to dry, each section was buffed using a clean, dry cotton cloth. The section polished with formulation B was easier to buff than formulation A. The polish films produced from both formulations were glossy, but the finish resulting from formulation B was more attractive due to its darker, richer appearance.

EXAMPLE IV

This example illustrates the high quality performance of polish formulations, which contain micronized wax, in comparison with commercial polishes. Paste formulations C and I, NuFinish ® liquid, Turtle Wax ® paste, and Rain Dance ® paste, were applied to individual sections of a 1989 black Cutlass Supreme. Air temperature and relative humidity were 75° F. and 74 percent at the time of application. After allowing an adequate length of time for the polishes to dry, each section was buffed using a clean, dry cotton cloth. The section polished with formulation C was the easiest to buff, followed by NuFinish ®, Turtle Wax ®, formulation I, and Rain Dance ®. Formulation I did not buff off evenly. Portions of residue were removed easily, but could not be removed with one pass. All of the polish films were glossy. Only formulation C, I and Turtle Wax ® provided a completely homogeneous finish with no evidence of any flaws such as streaking or uneven appearance.

EXAMPLE V

This example is another illustration of the high quality performance of a polish formulation which contains a micronized wax in comparison with a commercial product. NuFinish ® liquid polish and formulation G were applied to cool sections of a 1989 black Oldsmobile Cutlass Supreme. The air temperature and relative humidity were 76° F. and 73 percent, respectively. After allowing a suitable length of time for the polish to dry, a clean, dry cotton cloth was used to buff off the polish film and remove the hazy residue. The section polished with NuFinish ® liquid buffed off very easily, while formulation G required moderate effort. Comparison of the resultant polish films indicated that formulation G produced a glossy, darker, and more homogeneous finish than NuFinish ®.

EXAMPLE VI

This example again illustrates the high quality performance of polish formulations which contain a micronized wax in comparison with commercial products. NuFinish ® and polish formulation H were applied on a cool surface of a 1988 navy blue Buick LaSabre. Air temperature and relative humidity were 72° F. and 68 percent, respectively. After allowing a suitable time for the polish to dry, each polished section was buffed-off with a clean cotton cloth. Both polishes buffed-out easily and visual inspection of the two polished sections revealed that both had a glossy finish. However, the NuFinish ® polish film was badly streaked. No streaking was observed in the finish produced by the formulation H.

EXAMPLE VII

This example also illustrates the high quality performance of automotive polish formulations which contain micronized wax in comparison with commercial products. Rally ® and formulation E were applied to the roof and trunk of a 1988 maroon Toyota Camry. Air temperature was 78° F. The surface temperature of the automobile was greater than 100° F. After allowing a suitable length of time for the polish film to dry, each section was buffed with a clean, dry cotton cloth. Formulation E buffed out more easily than the Rally ® product. The polish films of both products were glossy, but formulation E provided a finish that was more homogeneous and had a richer appearance. The section of roof polished with the Rally ® product showed some evidence of streaking and unevenness in the resultant polish film.

EXAMPLE VIII

This example compares the performance of a commercial product on a different automotive surface with that of a formulation which contains a micronized wax. Turtle Wax ® and polish formulation H were applied on a cool surface of a 1988 navy blue Buick LaSabre. Air temperature and relative humidity were 72° F. and 68 percent, respectively. After allowing a suitable time for the polish to dry, each polished section was buffed-off with a clean cotton cloth. Both polishes buffed-out easily. Visual inspection of the two polished sections revealed the presence of some streaks in the Turtle Wax ® polish film. No streaking was observed in the polished film of formulation H.

EXAMPLE IX

This example illustrates the comparison of a commercial product with another micronized wax formulation on still another type of automotive surface. Turtle Wax ® and polish formulation C were applied to warm surface sections of a 1987 black Nissan Maxima. Air temperature and relative humidity were 70° F. and 71 percent, respectively. After 30 minutes, the residue was removed with a clean, dry cotton cloth. Formulation C was easier to buff out, and was found to contain less streaking in the final polish film than Turtle Wax ®.

EXAMPLE X

This example is the same as Example IX except that a different set of polish conditions was employed. Turtle Wax ® and formulation C were applied to the surface of a 1987 black Nissan Maxima. Air temperature and relative humidity were 76° F. and 66 percent, respectively. After allowing a suitable time for the polish to dry, each polished section was buffed using a dry clean cotton cloth. Formulation C buffed out easily, whereas moderate effort was required to buff the section polished with Turtle Wax ®. The resultant polish films for both formulations were glossy, but both contained some flaw such as a streak and/or uneven appearance. However, these regions were re-buffed to produce a flawless, very homogeneous, and glossy finish for each polished section.

EXAMPLE XI

Turtle Wax ® paste polish and formulation E were applied to the warm surface (>100° F.) of a 1988 maroon Toyota Camry. Air temperature was 78° F. After allowing an adequate length of time for the polish to dry, a dry clean cotton cloth was used to buff out the polish film and remove the hazy residue. Formulation E buffed off easily. The section polished with Turtle Wax ® was more difficult to buff. Both polishes produced a nice glossy finish on the automobile surface. The polish film produced by formulation E was more homogeneous and had a richer appearance.

EXAMPLE XII

This example illustrates the use of other types of micronized waxes in automotive polish formulations. Formulations J, K, L, M, N, O, P, and Q were applied on individual sections of a 1989 dark blue Toyota Camry. Air temperature and relative humidity were 75° F. and 78 percent, respectively. After allowing a suitable length of time for the polishes to dry, each polished section was buffed with a clean dry cotton cloth. All polished sections were very easily buffed. Most of the resultant polish films exhibited flaws in the initial finish that were easily buffed out with additional light effort. The final finish for all of these formulations was smooth, rich, and very glossy.

EXAMPLE XIII

Turtle Wax ® paste and formulation D were applied on individual sections of a 1986 red Toyota Corolla. Air temperature and relative humidity were 73.5° F. and 73 percent, respectively. After allowing a sufficient length of time for the polishes to dry, each polished section was buffed with a clean dry cloth. Both polishes could be buffed with light-to-moderate applied pressure. The glossy nature of the finish provided by formulation D was greater than that provided by Turtle Wax ®.

TABLE II

| INGRE-DIENTS | POLISH FORMULATIONS (PARTS PER HUNDRED) | | | | | | | | | | | | | | | | | | |
|---|---|---|---|---|---|---|---|---|---|---|---|---|---|---|---|---|---|---|---|
| | A | B | C | D | E | F | G | H | I | J | K | L | M | N | O | P | Q | R | S |
| (Oil Phase) | | | | | | | | | | | | | | | | | | | |
| Solvent No. 1 | 23 | 22.5 | | | | | | | 29 | | | | | | | | | | |
| Solvent No. 2 | | | 21.3 | 19.3 | 23.8 | 19.3 | 27.8 | 23.8 | | 26 | 26 | 26 | 26 | 26 | 26 | 26 | 26 | 22 | 23.8 |
| Amino-silicone No. 1 | 2 | 2 | 1.6 | 1.6 | 1.6 | 1.6 | 1.6 | 1.6 | 2 | 1.6 | 1.6 | 1.6 | 1.6 | 1.6 | 1.6 | 1.6 | 1.6 | 2 | 1.6 |
| Amino-silicone No. 2 | 1 | 1 | | | | | | | | | | | | 0.8 | 0.8 | 0.8 | 0.8 | | 0.8 |
| Amino- | | | | | | | | | | | | | | | | | | | |

TABLE II-continued

POLISH FORMULATIONS (PARTS PER HUNDRED)

| INGREDIENTS | A | B | C | D | E | F | G | H | I | J | K | L | M | N | O | P | Q | R | S |
|---|---|---|---|---|---|---|---|---|---|---|---|---|---|---|---|---|---|---|---|
| silicone No. 3 | | | | | | | | | | | | | | | | | | | |
| Silicone No. 4 | 1 | 1 | | 0.8 | 0.8 | 0.8 | 0.8 | | 1.0 | 0.8 | 0.8 | 0.8 | 0.8 | 0.8 | 0.8 | 0.8 | 0.8 | | 0.8 |
| Silicone No. 5 | | | 0.8 | | | | | 0.8 | | | | | | | | | | | |
| Silicone No. 6 | | | 0.01 | | | | | 0.01 | | | | | | | | | | | |
| Silicone No. 7 | | | | | | | | | | | | | | | | | | 1 | 1 |
| Silicone Resin | | | | | | | | | | | | | | | | | | | 0.8 |
| Emulsifier No. 1 | 1 | 1 | 1 | 1 | 1 | 1 | 1 | 1 | 1 | 1 | 1 | 1 | 1 | 1 | 1 | 1 | 1 | 1 | 1 |
| Emulsifier No. 2 | | | | | | | | | | | | | | | | | | | |
| Clay Thickener | 7 | 7 | 8.5 | 8.5 | 8.5 | 8.5 | | 8.5 | 1.0 | | | | | | | | | 8.5 | 8.5 |
| Micronized Wax | | 0.5 | 3 | 3 | 0.5 | 3 | 3 | 0.5 | | 3 | 3 | 3 | 3 | 3 | 3 | 3 | 3 | 0.5 | 0.5 |
| (Wax Type) (Water Phase) | | A | B | A | A | A | A | A | | C | D | E | B | F | G | H | I | A | A |
| Water | 52.5 | 52.5 | 53 | 55 | 53 | 53 | 53 | 53 | 52.5 | 54.5 | 54.5 | 54.5 | 54.5 | 54.5 | 54.5 | 54.5 | 54.5 | 52 | 53 |
| Abrasive No. 1 | 10 | 10 | 8 | | 8 | 3 | | 8 | | 10.3 | 10.3 | 10.3 | 10.3 | 10.3 | | | | | |
| Abrasive No. 2 | | | | 8 | | 7 | 10 | | 10 | | | | | | | | | | |
| Natural Wax | 0.5 | 0.5 | | | | | | 0.5 | | | | | | | | | | | |
| Miscellaneous | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 | 0–2.1 |

Wax Type: A and B are blends of synthetic and natural wax; C and I are blends of polyethylene and PTFE; D and G are polyethylene and modified polyethylene wax; F and E are Fischer-Tropsch wax and modified Fisher-Tropsch wax; and H is a micronized PTFE wax.
Solvents: Aliphatic hydrocarbons such as mineral spirits and kerosene.
Aminosilicones: 1 and 3 are hydrolyzable; 2 is non-hydrolyzable.
Silicones: Polymers of low, intermediate, and high viscosities.
Emulsifier: 1 is a silicone polyoxyalkylene; 2 is WITCAMIDE$^{(R)}$ an organic emulsifier.
Thickener: Bentonite and hectorite clays, added for viscosity control as a ten percent pre-gel.
Abrasives: Inorganic clay such as kaolin.
Natural Wax: Emulsified prior to incorporation in polish formulation.
Miscellaneous: Freeze-thaw additives, surfactants, colorants, etc., added to enhance stability or appearance.

The polishes of the present invention are of general application including such surfaces as motor vehicles, boats and navigable crafts, wood surfaces, plastic surfaces, and fiber surfaces. The films produce a high gloss, are durable, and are easy to apply.

It will be apparent from the foregoing that many other variations and modifications may be made in the structures, compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. In a water in oil polish emulsion containing as components thereof a wax, an abrasive and optionally at least one member selected from the group consisting of solvents, surfactants, thickening agents, detergent resistant additives, colorants, odorants and other ingredients normally used in making polishes, the improvement comprising incorporating into the oil phase of the water in oil polish emulsion at least one wax in the form of micronized particles having an average diameter of from about two to about forty-five microns in an amount of from about 0.5 to 3 parts per hundred per total parts polish emulsion.

2. The polish of claim 1 in which the micronized wax particles have an average diameter of from about two to about thirty microns.

3. The polish of claim 2 in which the micronized wax particles have an average diameter of from about two to about five microns.

4. The polish of claim 1 in which the water in oil polish emulsion includes a silane of the formula $R^3$—Si—$(OR^4)_3$ in which $R^3$ is phenyl or an alkyl radical of one, two or three carbon atoms, and $R^4$ is an alkyl radical of one or two carbon atoms.

5. The polish of claim 4 in which the silane is an alkyltrialkoxysilane selected from the group consisting of methyltrimethoxysilane, ethyltriethoxysilane, phenyltrimethoxysilane and phenyltriethoxysilane.

6. The polish of claim 1 in which the water in oil polish emulsion includes at least one organosilicon detergent resistant film forming additive compound which is an aminofunctional polysiloxane.

7. The polish of claim 1 in which the water in oil polish emulsion includes at least one organosilicon emulsifier which is a silicone polyoxyalkylene.

8. In an oil in water polish emulsion containing as components thereof a wax, an abrasive and optionally at least one member selected from the group consisting of solvents, surfactants, thickening agents, detergent resistant additives, colorants, odorants and other ingredients normally used in making polishes, the improvement comprising incorporating into the oil phase of the oil in water polish emulsion at least one wax in the form of micronized particles having an average diameter of from about two to about forty-five microns in an amount of from about 0.5 to 3 parts per hundred per total parts polish emulsion.

9. The polish of claim 8 in which the micronized wax particles have an average diameter of from about two to about thirty microns.

10. The polish of claim 9 in which the micronized wax particles have an average diameter of from about two to about five microns.

11. The polish of claim 8 in which the oil in water polish emulsion includes a silane of the formula $R^3—Si—(OR^4)_3$ in which $R^3$ is phenyl or an alkyl radical of one, two or three carbon atoms, and $R^4$ is an alkyl radical of one or two carbon atoms.

12. The polish of claim 11 in which the silane is an alkyltrialkoxysilane selected from the group consisting of methyltrimethoxysilane, ethyltriethoxysilane, phenyltrimethoxysilane and phenyltriethoxysilane.

13. The polish of claim 8 in which the oil in water polish emulsion includes at least one organosilicon detergent resistant film forming additive compound which is an aminofunctional polysiloxane.

14. The polish of claim 8 in which the oil in water polish emulsion includes at least one organosilicon emulsifier which is a silicone polyoxyalkylene.

* * * * *